Aug. 16, 1960     A. J. STEINTHAL     2,949,263
DRAG CHUTE SYSTEM FOR AIRCRAFT Filed Sept. 28, 1956     9 Sheets-Sheet 1

FIG. 1

INVENTOR
AUGUSTUS J. STEINTHAL
BY
ATTORNEYS

Aug. 16, 1960 A. J. STEINTHAL 2,949,263
DRAG CHUTE SYSTEM FOR AIRCRAFT
Filed Sept. 28, 1956 9 Sheets-Sheet 2

INVENTOR
AUGUSTUS J. STEINTHAL
BY
Jacobi & Jacobi
ATTORNEYS

United States Patent Office 2,949,263
Patented Aug. 16, 1960

2,949,263

DRAG CHUTE SYSTEM FOR AIRCRAFT

Augustus J. Steinthal, New York, N.Y., assignor to M. Steinthal & Co., Inc., New York, N.Y., a corporation of New York Filed Sept. 28, 1956, Ser. No. 612,623

24 Claims. (Cl. 244—113)

This invention relates to aeronautics and more particularly to a drag chute system for decelerating the speed of aircraft during landing.

As is well known, modern aircraft, particularly those of the jet propelled type, have a relatively high landing speed and while with piston engine aircraft, the pitch of the propellers may be reversed to slow the aircraft during landing, such an expedient is not available with jet propelled aircraft. As a consequence, it has been necessary to provide extremely long runways or landing strips thereby materially increasing the cost of airport construction and, furthermore, the provision of extra long runways is in many instances not feasible due to the terrain and this, of course, is often true in military installations, particularly in areas utilized for military operations and in which it is often necessary to construct a landing strip in a relatively short time.

There is also the further consideration that in landing relatively high speed aircraft of the jet propelled type, the stopping of the aircraft within a reasonable distance results in excessive wear of the brakes and tires, thereby materially increasing the cost of maintenance and one of the more important considerations is that of safety, since in the event an aircraft over-shoots the runway, damage to such aircraft inevitably results and in some instances, the flight personnel may be injured.

Accordingly, a system which will provide for relatively rapid deceleration of a landing aircraft within a reasonable distance and one which will result in reducing the wear on brakes and tires of such aircraft represents a very material step forward in the art and such a system is provided by this invention. While the drag chute system of this invention is primarily intended for use in jet propelled aircraft in normal landing operations, nevertheless, the same may be conveniently installed in piston engine planes to be utilized for deceleration purposes during emergency landings and which will permit such landings on relatively short runways or landing strips, such as are frequently found at emergency landing fields.

Briefly stated, the drag chute system of this invention includes a main drag chute having a canopy and shroud lines terminating in a riser which is attached to the aircraft. A pilot chute of considerable smaller diameter than the main chute is provided and the shroud lines of such pilot chute are connected to a bridle and a similar bridle is attached at substantially the center of the canopy of the main chute. A deployment bag is provided having two compartments therein, one for receiving the main chute when in folded condition and the other for receiving the pilot chute when in folded condition. This results in providing a unitary package which may be conveniently stowed in the drag chute compartment of the aircraft and, of course, means is provided for releasing the pilot chute from the deployment bag, which pilot chute when inflated serves to pull the deployment bag and main chute from the drag chute compartment of the aircraft as a result of which a rip cord means on the deployment bag is operated to open the compartment containing the main drag chute, whereupon such chute is inflated and serves to decelerate the speed of the aircraft to which the same is attached. After landing, the main drag chute, together with the deployment bag and pilot chute, is disconnected from the aircraft and such chutes are re-packed in the deployment bag for stowage in the aircraft and is then available for another landing operation.

A further and very important consideration is the fact that the drag chute must become fully operative within an extremely short period of time and it has been found that this time interval should not exceed three seconds from the time the pilot of the aircraft opens the drag chute compartment until the main drag chute is fully inflated. This requires that within a period of three seconds the doors or other closure means of the drag chute compartment in the aircraft open, the pilot chute is released from the pilot chute compartment of the deployment bag, the pilot chute withdraws the deployment bag from the compartment of the aircraft and the main drag chute is released from the deployment bag and inflated to decelerate the speed of the aircraft.

The drag chute system of this invention consistently operates well within this time limit and, furthermore, the cost thereof is such that there is a material reduction in the cost of landing operations occasioned primarily by the reduction in wear on the brakes and tires of the aircraft.

It is accordingly an object of the invention to provide a drag chute system for aircraft which may be economically constructed from readily available materials, thereby materially decreasing the cost of landing operations by reducing the wear on brakes and tires of the aircraft and, furthermore, a system which will operate in a sufficiently short time to declerate the speed of the aircraft within a reasonably short distance.

A further object of the invention is the provision of a drag chute system for aircraft including a main drag chute, a pilot chute and a deployment bag for receiving the main chute and pilot chute and providing a unitary package for convenient stowage in the drag chute compartment of the aircraft.

A still further object of the invention is the provision of a drag chute system for aircraft including a main drag chute, a pilot chute and a deployment bag for receiving the main chute and pilot chute to provide a unitary package and in which means is provided for forcibly ejecting the pilot chute from the depolyment bag upon opening of the compartment in the deployment bag containing such pilot chute.

Another object of the invention is the provision of a drag chute system for aircraft including a main drag chute, a pilot chute and a deployment bag for receiving the main chute and pilot chute and in which a weight is provided at substantially the center of the canopy of the pilot chute in order to increase the inertia of the pilot chute and facilitate ejection thereof from the compartment of the deployment bag containing such pilot chute.

A further object of the invention is the provision of a drag chute system for aircraft including a main drag chute, a pilot chute and a deployment bag for receiving the main chute and pilot chute to provide a unitary package, the pilot chute being provided with a weight for increasing the inertia thereof and impact tension means in the pilot chute for absorbing the impact of the weight during ejection of the pilot chute from the compartment in the deployment bag containing the same.

A still further object of the invention is the provision of a drag chute system for aircraft including a main drag chute, a pilot chute and a deployment bag for receiving the main chute and pilot chute to provide a unitary package and in which the deployment bag provides a compartment for receiving the main drag chute and a separate compartment for receiving the pilot chute, there also being provided means for automatically opening the pilot chute compartment to release the pilot chute therefrom and thereafter opening the main drag chute compartment to permit withdrawal of such chute therefrom.

Another object of the invention is the provision of a drag chute system for aircraft including a main drag chute, a pilot chute and a deployment bag for receiving the main chute and pilot chute to provide a unitary package and in which the deployment bag includes a top wall and opposite side walls providing an elongated package of substantially semi-circular cross section and in which the top wall is provided with reinforcing means for maintaining the shape of the same and for facilitating packing of the main chute in the deployment bag and stowage of the resulting package in the drag chute compartment of the aircraft.

A further object of the invention is the provision of a drag chute system for aircraft including a main drag chute, a pilot chute and a deployment bag for receiving the main chute and the pilot chute to provide a unitary package and in which means is provided for attaching the main chute and pilot chute to the deployment bag thereby permitting the entire system to be conveniently retrieved after landing of the aircraft.

A still further object of the invention is the provision of a drag chute system for aircraft including a main drag chute, a pilot chute and a deployment bag which may be conveniently constructed in such a manner as to withstand wear, thereby permitting repeated re-use of the system and which may be made of sufficiently light weight to not materially add to the weight of the aircraft with which the same is to be utilized.

Further objects and advantages of the invention will be apparent from the following description taken in conjunction with the accompanying drawings, wherein:

Figure 13 is a plan view of the outer surface of the main panel shown in Figure 12.

Figure 1:
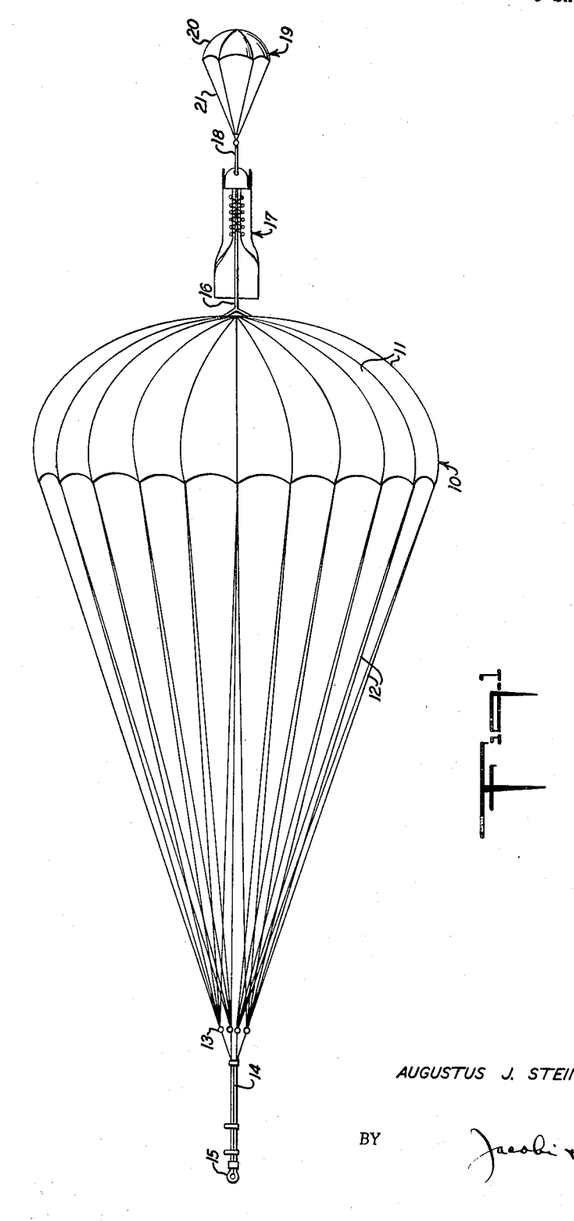
Figure 1 is a diagrammatic elevational view showing a drag chute system constructed in accordance with this invention and with the main drag chute and pilot chute inflated, the deployment bag being shown in place between the pilot chute and canopy of the main chute.
Figure 2:
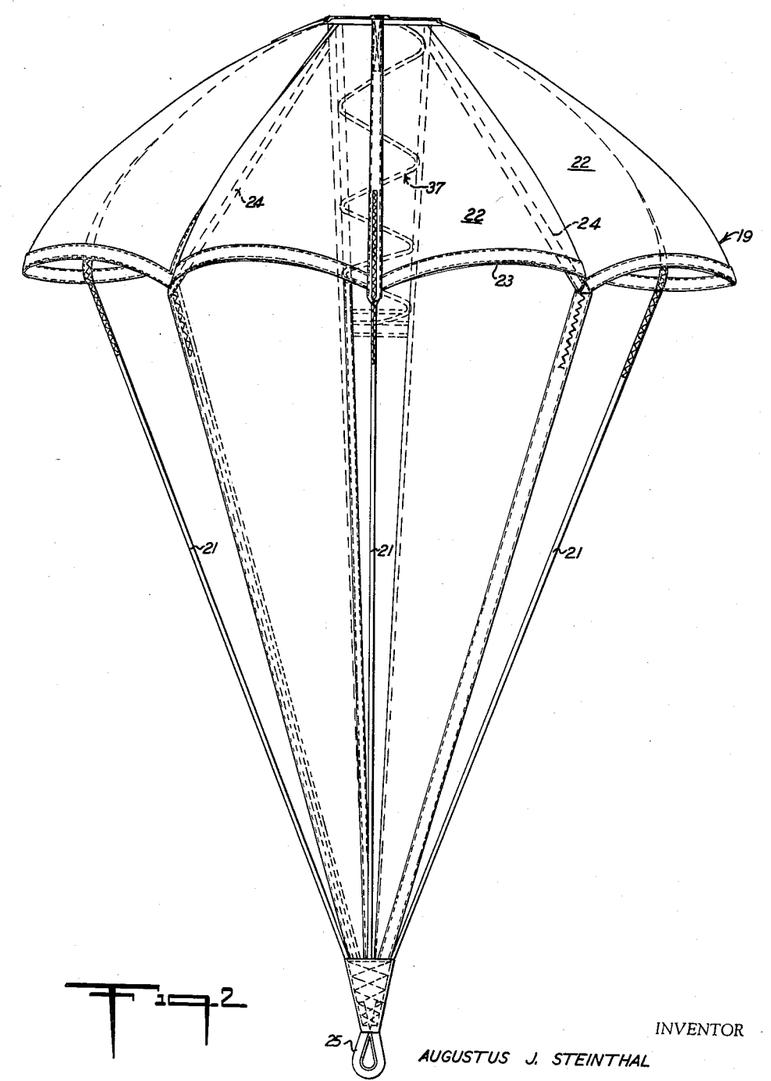
Figure 2 is a side elevational view of the pilot chute utilized in the drag chute system of this invention and showing the same inflated.
Figure 3:
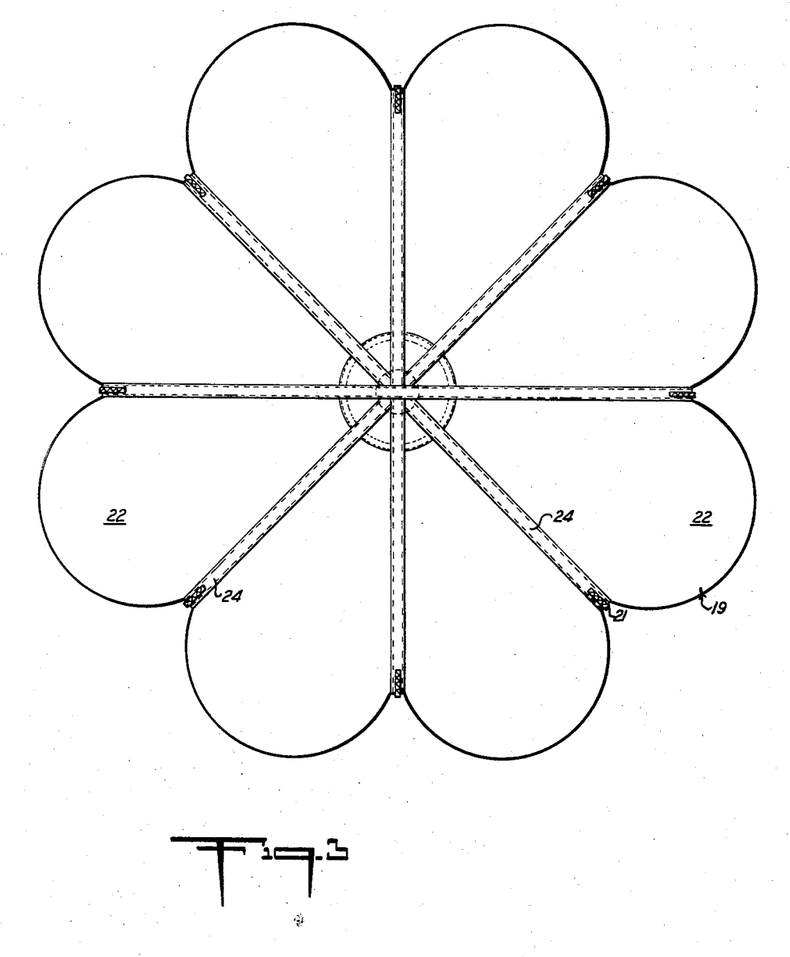
Figure 3 is a top plan view of the pilot chute utilized in the drag chute system of this invention and showing such pilot chute inflated.

With continued reference to the drawings, there is shown in Figure 1 a drag chute system for aircraft constructed in accordance with this invention and which may well include a main drag chute 10 comprising a canopy 11 of suitable material, such as, nylon, and to the skirt of which are attached a plurality of shroud lines 12 which in turn are secured at their ends 13 to a riser or cable 14 provided with suitable means 15 at the end thereof for attaching the riser 14 to the aircraft with which the drag chute system is to be utilized. Secured to the canopy 11 of the main chute 10 substantially at the center thereof is a bridle 16 which in turn is attached to a deployment bag 17 and also attached to the deployment bag 17 by a bridle 18 is a pilot chute 19. The pilot chute 19 is provided with a canopy 20 of substantially less diameter than the main canopy 11 of the drag chute 10 and secured to the skirt of the canopy 20 of the pilot chute 19 are a plurality of shroud lines 21 which serve to attach the canopy 20 to the bridle 18. The specific structure of the pilot chute 19 as well as the structure of the deployment bag 17 which serves to receive both the main drag chute 10 and the pilot chute 19 when in folded condition to provide a unitary package will be later described.

With particular reference to Figures 2 to 7, inclusive, the pilot chute 19, as mentioned above, includes the canopy 20 which may be constructed from a plurality of panels 22 of suitable configuration and of suitable material, such as, nylon, or the like, and such panels 22 terminate at their outer edges in a skirt 23 to which are attached the shroud lines 21. The shroud lines 21 may comprise tapes or cords 24 which extend across the top of the canopy 20, as clearly shown in Figure 3, and downwardly from the skirt 23 to form a loop 25. The loop 25 serves to provide a means for attaching the bridle 18 which in turn secures the pilot chute 19 to the deployment bag 17 in a manner to be later described.

Figures 4, 5, 6, 7:
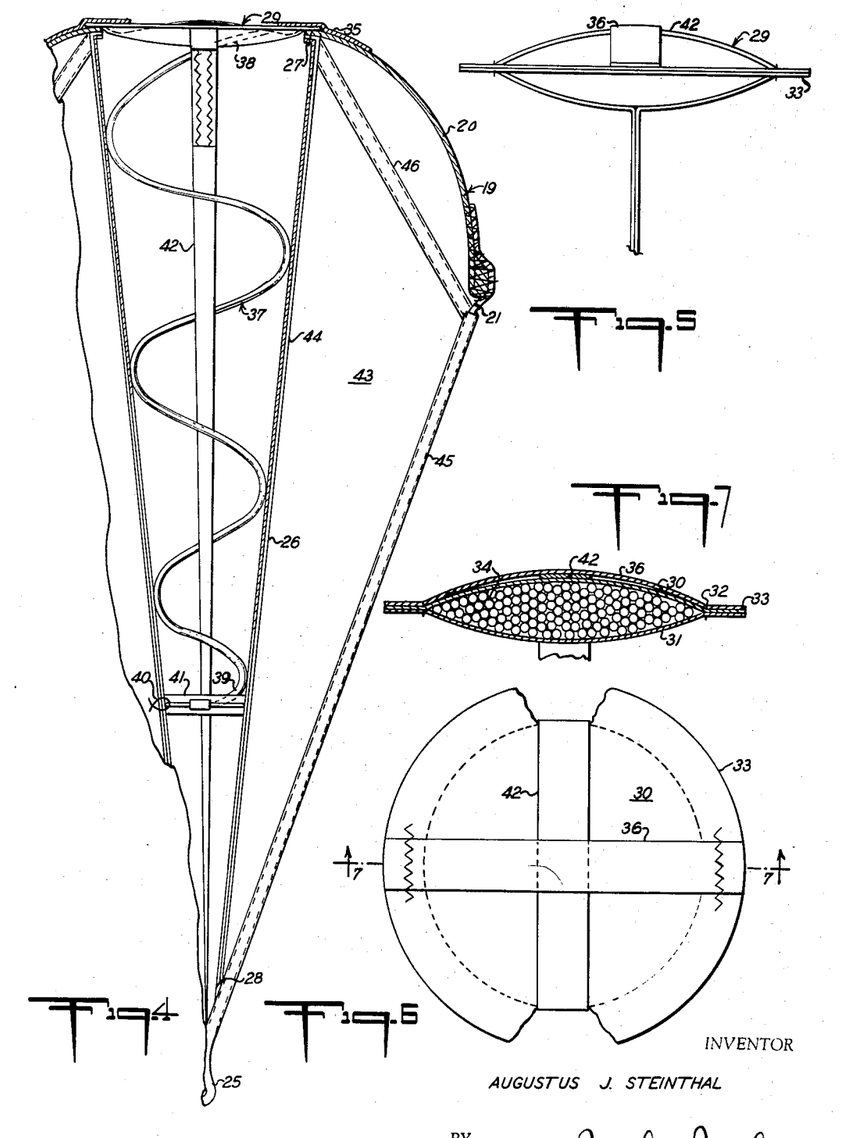
Figure 4 is a fragmentary sectional view of the pilot chute utilized in the drag chute system of this invention and showing the details of structure thereof as well as the manner of applying the weight to the canopy of the drag chute and the structure and manner of operation of the impact strap for absorbing the impact of such weight.
Figure 5 is a side elevational view of the weight which is attached to the canopy of the pilot chute and also showing a portion of the impact tension strap.
Figure 6 is a top plan view of the weight shown in Figure 5 with parts broken away for greater clarity.
Figure 7 is a sectional view, taken substantially on the line 7—7 of Figure 6 and showing the structure of the pouch forming the weight, together with the metallic pellets in place therein.
Figure 8:
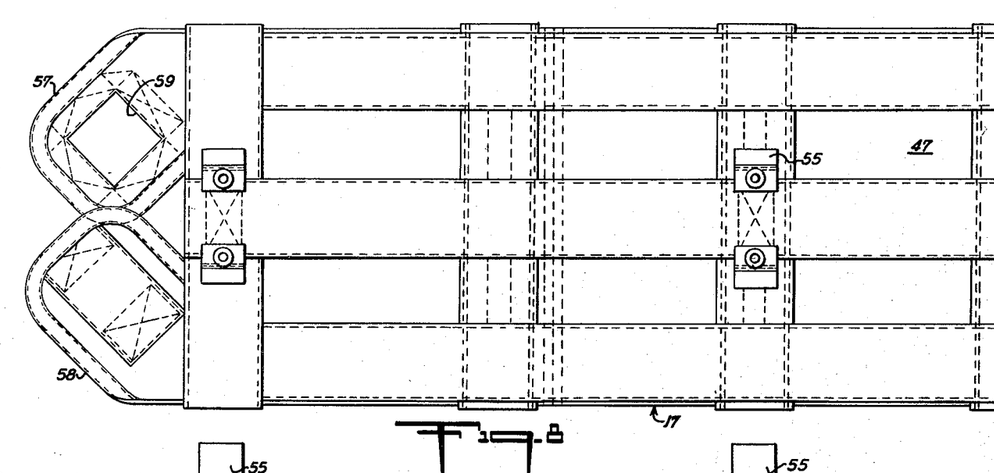
Figure 8 is a top plan view of a portion of the deployment bag utilized in the drag chute system of this invention.
Figures 8A, 9A:
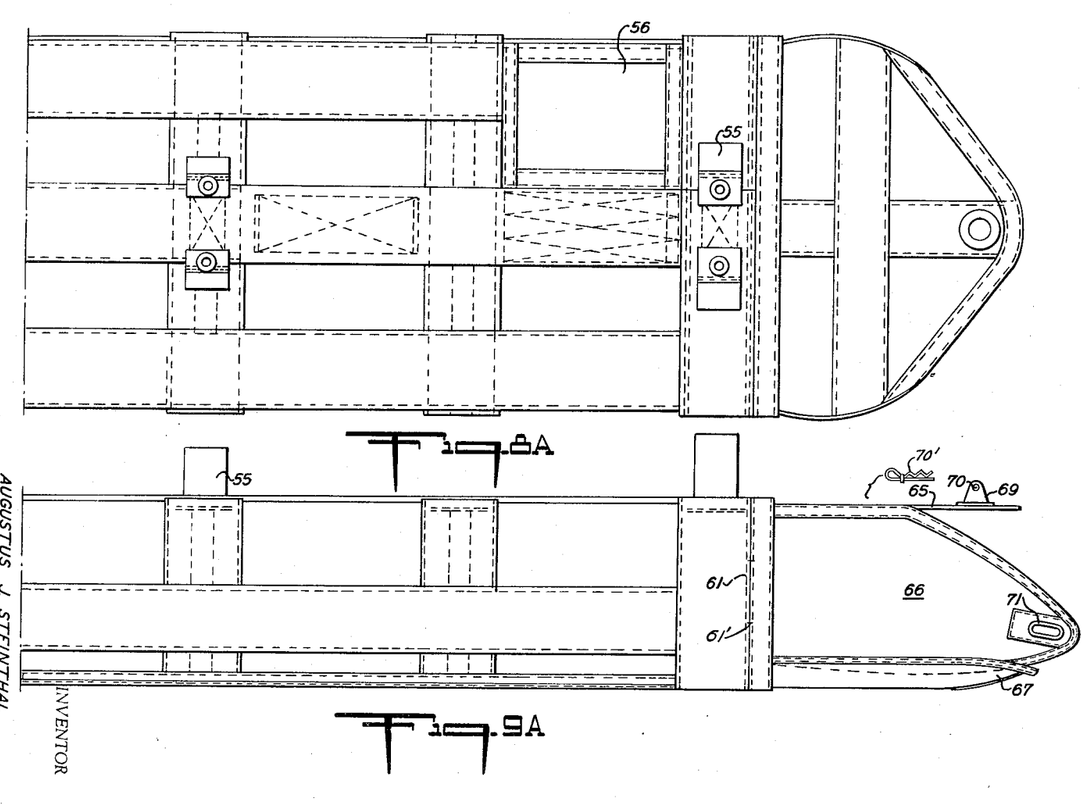
Figure 8A is a top plan view of the remaining portion of the deployment bag shown in Figure 8.
Figure 9A is a side elevational view of the remaining portion of the deployment bag shown in Figure 9.
Figure 9:
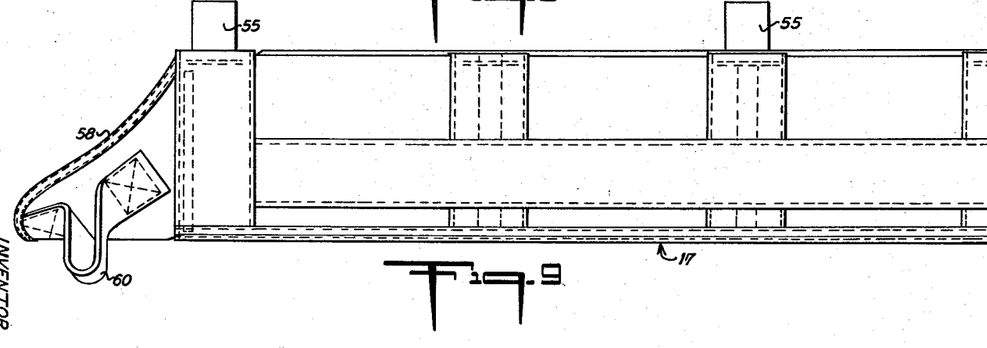
Figure 9 is a side elevational view of one portion of the deployment bag.

Centrally of the pilot chute 19, there is provided a flexible fabric cone 26 which is disposed in inverted position with the base 27 thereof secured to the canopy 20 adjacent the center and the apex 28 of the cone 26 is secured to the shroud lines 21 adjacent the loop 25. A weight 29 which is circular or disk-shaped in formation may be constructed in the form of a pouch and as best shown in Figures 5, 6 and 7, such weight 29 may be formed of upper and lower walls 30 and 31, respectively, and of suitable flexible material, such as, nylon, with the walls 30 and 31 secured together adjacent their outer edges, as by stitching 32, and providing a marginal flange 33 by means of which the weight 29 is secured to the canopy 20 and base 27 of the cone 26. The pouch forming the weight 29 may be filled with suitable relatively heavy material, such as, lead shot 34, or, of course, other metallic pellets or loose material may be employed for this purpose, if desired. Likewise, if desired, the lead shot 34 may be replaced by a solid weight of suitable material, such as, a metallic plate, but a loose material, such as, shot, is preferable since the pouch may then be conveniently molded to the desired shape. As best shown in Figure 4, a reinforcement 35 of suitable fabric material may be secured to the canopy 20 adjacent the center thereof and such reinforcement 35 secured by stitching or other suitable means to the marginal flange 33 of the weight 29 and the base 27 of the cone 26. The upper wall 30 of the weight 29 may also be reinforced by a cross strap 36 extending diametrically across the same and secured to the marginal flange 33 as well as to the reinforcement 35 and base 27 of the cone 26.

A compression spring 37 is disposed within the cone 26 and the upper end 38 of the spring 37 engages the lower wall 31 of the weight 29 and the lower end 39 of the spring 37 may be secured to the wall of the cone 26 in any suitable manner, such as by stitching 40 and, if desired, a reinforcing tape 41 may be attached to the inner surface of the wall of the cone 26 and to the lower convolution of the spring 37.

In order to absorb the impact of the weight 29 caused by expansion of the spring 37 during ejection of the pilot chute 19 from the deployment bag 17 in a manner to be later described, there may be provided means in the form of an endless impact tension strap 42 which extends across the upper wall 30 of the weight 29 as clearly shown in Figure 6 and downwardly as shown in Figure 4 and around the loop 25 to provide a connection between the loop 25 and the weight 29. It should be noted that the length of the strap 42 from the weight 29 to the loop 25 should be less than the length of the cone 26 from the base 27 to the apex 28 thereof in order that the entire impact load of the weight 29 will be absorbed by the strap 42 rather than by the cone 26. If the strap 42 were not provided for this purpose, the weight 29 would be torn loose from the canopy 20 and cone 26 during the ejecting operation. However, the impact tension strap 42 may be made of sufficient strength to withstand the entire load and, consequently, no increased strain is placed on the canopy 20 or cone 26 as a result of providing the weight 29. It has been found that provision of the weight 29 is necessary in order to provide proper ejection of the pilot chute 19 from the deployment bag 17 since, obviously, the material of the canopy 20 of the pilot chute and the remainder thereof is relatively light and does not provide sufficient inertia to permit rapid and proper ejection of the pilot chute from the deployment bag. The provision of the weight 29 together with the compression spring 37, however, results in rapid and effective effection of the pilot chute 19 from the deployment bag 17.

In order to control the air flow beneath the canopy 20 of the pilot chute 19 and to facilitate inflation thereof, there may be provided a plurality of fabric vanes 43 secured along their inner edges 44 to the wall of the cone 26 and disposed radially thereof and with the outer edges 45 of the vanes 43 surrounding and secured to the shroud lines 21. The vanes 43 extend downwardly to the apex of the cone 26 and terminate at their upper ends in diagonal edges 46 which are spaced below the canopy 20, as clearly shown in Figure 4, to permit flow of air beneath the canopy 20 and above the upper edges 46 of the vanes 43.

The above described pilot chute 19 may be conveniently packed in the deployment bag 17 in a manner to be later described and the provision of the compression spring 37, as well as the weight 29 and the impact tension strap 42, results in a chute structure permitting rapid ejection from the deployment bag 17 with a consequent rapid inflation thereof and at the same time provides a structure which will readily withstand all forces exerted thereon and without damage thereto.

Figure 11:
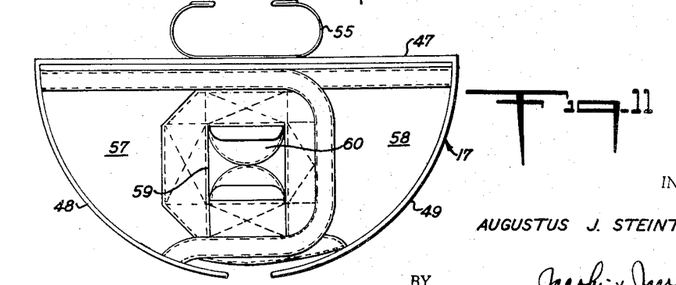
Figure 11 is an end elevational view of the deployment bag.

The deployment bag 17 comprises essentially a main panel 47 providing a top wall and side panels 48 and 49 providing side walls which cooperate with the top wall to provide an elongated bag substantially semi-circular in cross section as shown in Figure 11. The deployment bag 17 is formed of suitable fabric material, such as, nylon, and may be of a size and shape to receive the main drag chute 10 as well as the pilot chute 19 and be conveniently stowed in the drag chute compartment provided in the aircraft.

Figure 12:
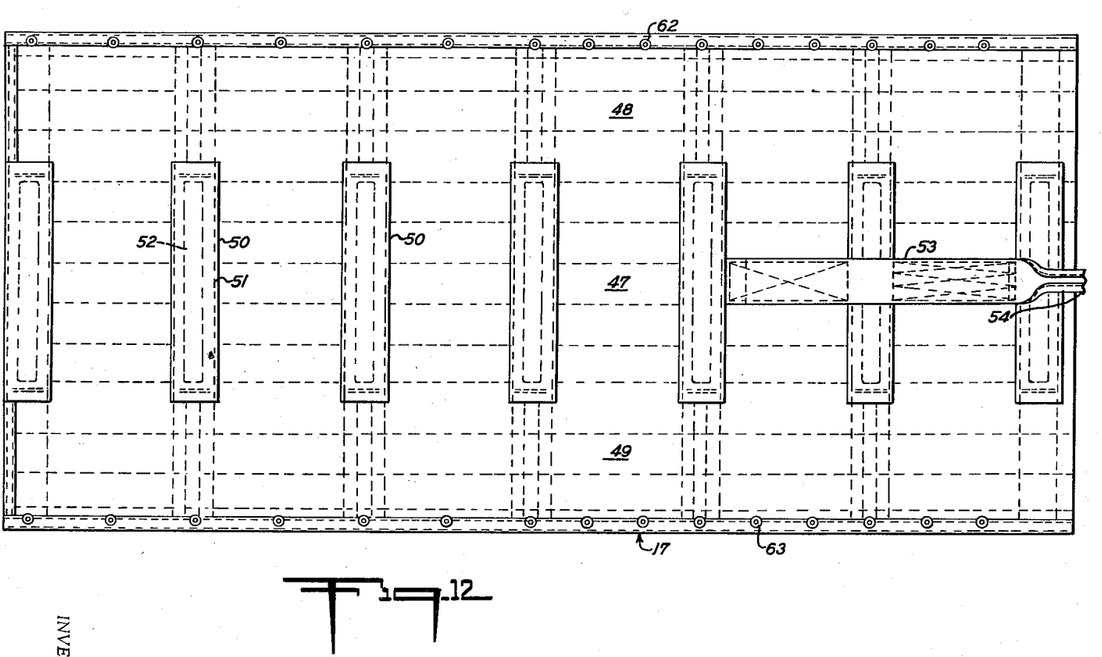
Figure 12 is a plan view of the inner surface of the main panel forming the top wall of the deployment bag utilized in the drag chute system of this invention.

With particular reference to Figure 12, the main panel 47 of the deployment bag 17 may be of elongated substantially rectangular configuration and secured to the inner surface of the main panel 47 are a plurality of longitudinally spaced longitudinally disposed pockets 50 which may be formed by strips of fabric secured to the main panel 47 by any suitable means, such as, stitching 51. Received within each pocket 50 is an elongated metallic reinforcing member 52, although, if desired, such reinforcing member may be formed of other non-metallic material which will provide sufficient reinforcement. As seen from Figure 12, the reinforcing members 52 extend substantially the entire width of the main panel 47 and consequently serve to maintain the same substantially flat which materially facilitates packing of the main drag chute canopy 11 in the deployment bag 17 and also materially assists in stowage of the deployment bag in the compartment provided therefor in the aircraft. Secured to the inner surface of the main panel 47 is a fabric strap 53 which terminates in a loop 54, the purpose of which will be later described. As shown in Figure 13, a plurality of clips 55 are secured to the outer surface of the main panel 47 in longitudinally spaced relation and located substantially along the longitudinal center line of the deployment bag 17. Also secured to the outer surface of the main panel 47 is a pocket 56 which may be utilized to receive the log book for the particular drag chute system and in which may be entered the date of use of each system in order to provide a permanent record thereof and to indicate the probable time at which it will be necessary to replace the system. The clips 55 may be of the configuration shown in Figure 11 and these clips are provided for releasably retaining the riser 14 attached to the shroud lines 12 of the main drag chute 10 when the canopy 11 of such main drag chute 10 is packed in the deployment bag 17. The clips 55 serve to release the folded riser 14 upon withdrawal of the main drag chute 10 from the deployment bag 17.

Secured to the rear end of the main panel 47 and side panels 48 and 49 are closure flaps 57 and 58 and these flaps serve to over lap in folded condition to close the rear end of the deployment bag 17 when the canopy 11 of the main drag chute 10 is packed therein. The flap 57 may be provided with an aperture 59 and the flap 58 is provided with a loop 60 projecting from the outer surface thereof and when the flaps 57 and 58 are in folded condition, the loop 60 may project through the aperture 59 in the flap 57. In this position, a fold of the riser 14 on the main drag chute 10 is inserted through the loop 60 and serves to retain the flaps 57 and 58 in folded closing position until such time as the fold of the riser 14 is withdrawn from the loop 60. This operation is occasioned by withrawal of the deployment bag with the main drag chute 10 therein from the drag chute compartment of the aircraft.

Figure 10:
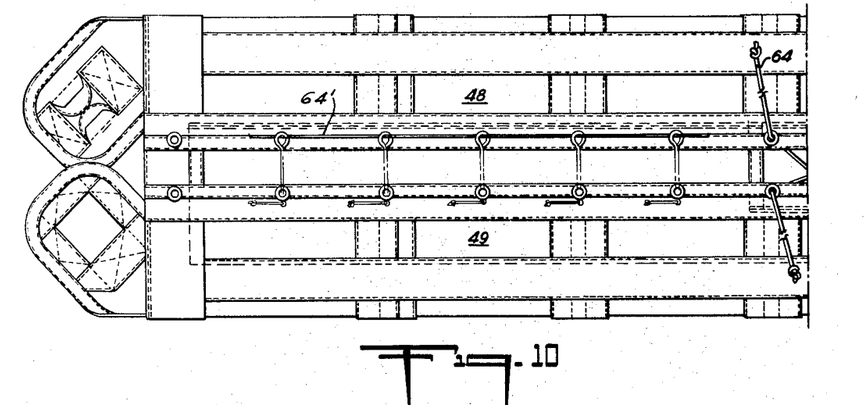
Figure 10 is a bottom plan view of one portion of the deployment bag utilized in the drag chute system of this invention.
Figure 10A:
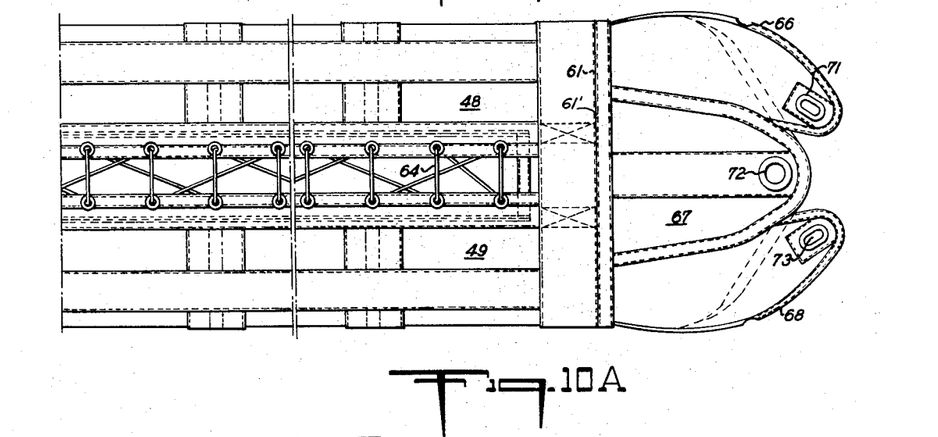
Figure 10A is a bottom plan view of the remaining portion of the deployment bag shown in Figure 10.

The forward end of the deployment bag 17 is provided with an end wall 61 secured to the main panel 47 and the side panels 48 and 49 and such end wall 61 may be provided with an aperture 61' the purpose of which will be presently described. The side panels 48 and 49 are provided, respectively, with a series of longitudinally spaced eyelets 62 and 63 and as shown in Figure 10, these eyelets serve to receive a lacing 64 which serves to close the side panels 48 and 49 thereby together with the main panel 47, end wall 61 and closure flaps 57 and 58, providing an elongated compartment substantially semi-circular in cross section for receiving the canopy 11 of the main drag chute 10. As shown in Figure 10, the lacing 64 terminates substantially midway of the length of the side panels 48 and 49 and the remainder of the length of these side panels is secured together by a rip cord arrangement 64' but which is entirely conventional in every respect and which upon withdrawal of the deployment bag 17 from the drag chute compartment of the aircraft is released thereby allowing the side panels 48 and 49 to open and permit withdrawal of the canopy 11 of the main drag chute 10.

Secured to the main panel 47 and side panels 48 and 49 at the forward end thereof are a plurality of flaps 65, 66, 67 and 68 and flap 65 may be provided adjacent its outer end with an outwardly extending cone-shaped member 69 which may be provided with an aperture 70 extending therethrough adjacent the apex and flap 66 may be provided with a grommet 71 adjacent the outer end thereof, while flaps 67 and 68 may be provided with similar grommets 72 and 73, respectively. The flaps 65, 66, 67 and 68 are so formed as to be folded with the outer ends thereof in overlapping position and with the cone-shaped member 69 projecting through the registering grommets 71, 72 and 73. The flaps may be retained in this folded position by a removable pin 70' projecting through the aperture 70 in the cone-shaped member 69. The flaps 65, 66, 67 and 68 in this folded position provide, together with the end wall 61, a compartment for receiving the pilot chute 19 and it is to be noted that the bridle 18 secured to the shroud lines 21 of the pilot chute 19 projects through the aperture in the end wall 61 and is secured to the loop 54 of the strap 53 which in turn is secured to the main panel 47 of the deployment bag 17.

In operation, the canopy 11 of the main drag chute 10 is folded and packed in the compartment provided by the main panel 47 and side panels 48 and 49 and the side panels 48 and 49 are held in place by the lacing 64 and the rip cord arrangement described above. The riser 14 connected to the should lines 12 of the main drag chute 10 projects outwardly of the rear end of the deployment bag 17 and the closure flaps 57 and 58 are folded with the loop 60 on the closure flap 58 projecting through the aperture 59 in the closure flap 57 and a fold of the riser 14 is inserted through the loop 60 to hold the flaps 57 and 58 in folded condition. The remainder of the riser 14 is folded and inserted in the clips 55 attached to the upper surface of the main panel 47 of the deployment bag 17.

The pilot chute 19 is folded with the compression spring 37 in compressed or collapsed position and such flap is inserted in the compartment provided by the flaps 65, 66, 67 and 68 with the lower end 39 of the spring 37 in engagement with the end wall 61 of the deployment bag 17 and upon closing the flaps 65, 66, 67 and 68 with the cone-shaped member 69 projecting through the grommets 71, 72 and 73 and with the insertion of a removable pin through the aperture 70 in the cone-shaped member 69, the above mentioned flaps will be retained in closed position and the folded pilot chute 19 will be retained in the pocket provided therefor with the spring 37 in collapsed condition.

Packing of the main drag chute 10 and the pilot chute 19 in the deployment bag 17 serves to provide a unitary package which due to the construction thereof and particularly the transverse reinforcing member 52 will maintain its shape and may be conveniently stowed in the drag chute compartment provided in the aircraft.

Upon stowage of the deployment bag 17 containing the main drag chute 10 and the pilot chute 19, in the compartment provided therefor in the aircraft, the door or other means closing such compartment may be closed and the pin received in the aperture 70 of the cone-shaped member 19 may be removed thereby conditioning the system for use and release from the drag chute compartment in the aircraft. Upon landing of the aircraft, the pilot thereof releases the fastening means for the door closing the drag chute compartment in the aircraft and upon opening of such door, the flaps 65, 66, 67 and 68 will immediately fly apart and the pilot chute 19 will be projected from the compartment in the deployment bag 17 by the collapsed compression spring 37. The weight 29 provides sufficient inertia for this purpose and the pilot chute 19 will move outwardly into the air stream and become fully inflated, whereupon through the bridle 18 attached to the pilot chute 19 and to the deployment bag 17, the deployment bag will be withdrawn from the compartment in the aircraft and a static line, not shown, connected to the aircraft and to the rip cord means will actuate such rip cord means to open the side panels 48 and 49 of the deployment bag 17 thereby permitting withdrawal of the main canopy 11 of the drag chute 10 due to the pull of the pilot chute 19 through the bridle 16 attached to the canopy 11 of the drag chute 10 and upon entering the air stream, the canopy 11 of the drag chute 10 will become inflated and will operate to decelerate the speed of the aircraft. Upon completion of the landing, the riser 14 will be detached from the aircraft and the drag chute system may be retrieved and repacked for future use.

The above described drag chute system provides a complete unitary structure which may be conveniently packaged as a unit for stowage in the aircraft and which will operate in an extremely short period of time in order to provide for adequate deceleration of the forward speed of the aircraft during landing. Furthermore, by reason of the provision of the impact tension strap 42 in the pilot chute 19, damage to such pilot chute by reason of the impact of the weight 29 during ejection thereof from the deployment bag 17 is avoided and the entire drag chute system is of such economical construction that material reduction in the cost of landing operations as compared to those conducted solely with the brakes provided on the aircraft is possible. Furthermore, landings may be accomplished in a materially less distance thereby permitting the use of shorter landing strips or runways and providing a safety feature which permits landings on emergency landing fields.

It will be obvious to those skilled in the art that various changes may be made in the invention without departing from the spirit and scope thereof and therefor the invention is not limited by that which is shown in the drawings and described in the specification, but only as indicated in the appended claims.

What is claimed is:

1. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a plurality of radially disposed longitudinally extending fabric vanes, each vane having substantially the entire length of the inner edge secured to said cone and substantially the entire length of the outer edge secured to a shroud line, each vane extending substantially from the apex of said cone and terminating in a diagonal upper edge in spaced relation to said pilot chute canopy, a weight comprising a circular fabric pouch substantially filled with metallic pellets, marginal flange on said pouch secured to the canopy of said pilot chute and the base of said cone substantially in alignment with said cone, an endless impact tension strap extending diametrically across the upper surface of said pouch and downwardly along each side of said cone and around said loop to be attached to said second bridle, the length of said strap from said pouch to said loop being less than the length of said cone, a compression spring disposed in said cone with the upper end of said spring engaging the lower surface of said pouch and means intermediate the length of said cone for securing the lower end of said spring thereto whereby upon opening of said second compartment said spring will project said pilot chute therefrom and said tension strap will absorb substantially the full impact of said weight.

2. A drag chute system for aircraft as defined in claim 1 in which said metallic pellets comprise lead shot.

3. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a plurality of radially disposed longitudinally extending fabric vanes, each vane having the inner edge secured to said cone and the outer edge secured to a shroud line, each vane extending substantially from the apex of said cone and terminating in spaced relation to said pilot chute canopy, a weight comprising a circular fabric pouch substantially filled with metallic pellets, a marginal flange on said pouch secured to the canopy of said pilot chute and the base of said cone substantially in alignment with said cone, an endless impact tension strap extending diametrically across the upper surface of said pouch and downwardly along each side of said cone and around said loop to be attached to said second bridle, the length of said strap from said pouch to said loop being less than the length of said cone, a compression spring disposed in said cone with the upper end of said spring engaging the lower surface of said pouch and means intermediate the length of said cone for securing the lower end of said spring thereto whereby upon opening of said second compartment said spring will project said pilot chute therefrom and said tension strap will absorb substantially the full impact of said weight.

4. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a plurality of radially disposed longitudinally extending fabric vanes, each vane having the inner edge secured to said cone and the outer edge secured to a shroud line, each vane extending substantially from the apex of said cone and terminating in spaced relation to said pilot chute canopy, a weight comprising a circular fabric pouch substantially filled with loose material, said pouch being secured to the canopy of said pilot chute and the base of said cone substantially in alignment with said cone, an endless impact tension strap extending diametrically across the upper surface of said pouch and downwardly along each side of said cone and around said loop to be attached to said second bridle, the length of said strap from said pouch to said loop being less than the length of said cone, a compression spring disposed in said cone with the upper end of said spring engaging the lower surface of said pouch and means intermediate the length of said cone for securing the lower end of said spring thereto whereby upon opening of said second compartment said spring will project said pilot chute therefrom and said tension strap will absorb substantially the full impact of said weight.

5. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a weight comprising a circular fabric pouch substantially filled with loose material, said pouch being secured to the canopy of said pilot chute and the base of said cone substantially in alignment with said cone, an endless impact tension strap extending diametrically across the upper surface of said pouch and downwardly along each side of said cone and around said loop to be attached to said second bridle, the length of said strap from said pouch to said loop being less than the length of said cone, a compression spring disposed in said cone with the upper end of said spring engaging the lower surface of said pouch and means intermediate the length of said cone for securing the lower end of said spring thereto whereby upon opening of said second compartment said spring will project said pilot chute therefrom and said tension strap will absorb substantially the full impact of said weight.

6. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a weight comprising a fabric pouch substantially filled with loose material, said pouch being secured to the canopy of said pilot chute and the base of said cone substantially in alignment with said cone, an endless impact tension strap secured to said pouch and extending downwardly along each side of said cone and around said loop to be attached to said second bridle, the length of said strap from said pouch to said loop being less than the length of said cone, a compression spring disposed in said cone with the upper end of said spring engaging the lower surface of said pouch and means intermediate the length of said cone for securing the lower end of said spring thereto whereby upon opening of said second compartment said spring will project said pilot chute therefrom and said tension strap will absorb substantially the full impact of said weight.

7. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a weight comprising a fabric pouch substantially filled with loose material, said pouch being secured to the canopy of said pilot chute and the base of said cone substantially in alignment with said cone, an endless impact tension strap secured to said pouch and extending downwardly along each side of said cone and around said loop to be attached to said second bridle, the length of said strap from said pouch to said loop being less than the length of said cone, a compression spring disposed in said cone with the upper end of said spring engaging the lower surface of said pouch and means intermediate the length of said cone for securing the lower end of said spring thereto whereby upon opening of said second compartment said spring will project said pilot chute therefrom and said tension strap will absorb substantially the full impact of said weight.

8. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a weight comprising a fabric pouch substantially filled with loose material, said pouch being secured to the canopy of said pilot chute and base of said cone substantially in alignment with said cone, an endless impact tension strap secured to said pouch and extending downwardly along each side of said cone and around said loop to be attached to said second bridle, the length of said strap from said pouch to said loop being less than the length of said cone, a compression spring disposed in said cone with the upper end of said spring engaging the lower surface of said pouch and means for securing the lower end of said spring to said cone whereby upon opening of said second compartment said spring will project said pilot chute therefrom and tension strap will absorb substantially the full impact of said weight.

9. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a weight comprising a fabric pouch substantially filled with loose material, said pouch being secured to the canopy of said pilot chute and the base of said cone substantially in alignment with said cone, an impact tension strap secured to said pouch and extending downwardly along each side of said cone and around said loop to be attached to said second bridle, the length of said strap from said pouch to said loop being less than the length of said cone, a compression spring disposed in said cone with the upper end of said spring engaging the lower surface of said pouch and means for securing the lower end of said spring to said cone whereby upon opening of said second compartment said spring will project said pilot chute therefrom and said tension strap will absorb substantially the full impact of said weight.

10. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a weight comprising a fabric pouch substantially filled with loose material, said pouch being secured to the canopy of said pilot chute and the base of said cone substantially in alignment with said cone, an impact tension strap secured to said pouch and extending downwardly and around said loop to be attached to said second bridle, the length of said strap from said pouch to said loop being less than the length of said cone, a compression spring disposed in said cone with the upper end of said spring engaging the lower surface of said pouch and means for securing the lower end of said spring to said cone whereby upon opening of said second compartment said spring will project said pilot chute therefrom and said tension strap will absorb substantially the full impact of said weight.

11. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a weight comprising a fabric pouch substantially filled with loose material, said pouch being secured to the canopy of said pilot chute and the base of said cone substantially in alignment with said cone, an impact tension strap secured to said pouch and extending downwardly and around said loop to be attached to said second bridle, the length of said strap from said pouch to said loop being less than the length of said cone, a compression spring disposed in said cone and means for securing the lower end of said spring to said cone whereby upon opening of said second compartment said spring will project said pilot chute therefrom and said tension strap will absorb substantially the full impact of said weight.

12. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a weight comprising a metallic mass secured to the canopy of said pilot chute and the base of said cone substantially in alignment with said cone, an impact tension strap secured to said weight and extending downwardly and around said loop to be attached to said second bridle, the length of said strap from said weight to said loop being less than the length of said cone, a compression spring disposed in said cone and means for securing the lower end of said spring to said cone whereby upon opening of said second compartment said spring will project said pilot chute therefrom and said tension strap will absorb substantially the full impact of said weight.

13. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said pilot chute comprising a fabric cone having the base thereof attached to the pilot chute canopy substantially at the center, the shroud lines of said pilot chute being attached to said cone substantially at the apex thereof and providing a loop for attachment of said second bridle, a weight comprising a mass secured to the canopy of said pilot chute and the base of said cone substantially in alignment with said cone, an impact tension strap secured to said weight and extending downwardly and around said loop to be attached to said second bridle, the length of said strap from said weight to said loop being less than the length of said cone, a compression spring disposed in said cone and means for securing the lower end of said spring to said cone whereby upon opening of said second compartment said spring will project said pilot chute therefrom and said tension strap will absorb substantially the full impact of said weight.

14. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced pockets secured to said main panel, an elongated metallic reinforcing member disposed in each pocket, longitudinally spaced clips secured to the outer surface of said main panel, along the longitudinal center line thereof, flexible fabric side panels secured along one edge to the opposite side edges of said main panel to provide side walls, eyelets in the other edges of said side panels, a relatively rigid fabric end wall secured to said main panel and said side panels adjacent one end, an aperture in said end wall, overlapping closure flaps secured to said main and side panels adjacent the opposite end, registering apertures in certain of said flaps, a loop on one flap extending through said apertures when said flaps are folded in closing position, lacing means received in said eyelets from said one end to a point substantially midway of the length of said side panels and rip cord means received in the remainder of said eyelets to bring said other edges of said side panels together, said top wall, said side walls, said end wall and said closure flaps defining said first compartment substantially semi-circular in cross section, a bridle attaching loop secured to the inner surface of said main panel, adjacent said end wall, a plurality of overlapping longitudinally extending flaps secured to said main panel and said side panels adjacent said end wall, one of said last named flaps having a metallic cone-shaped member secured to the outer surface adjacent the outer end, registering grommets in the outer ends of the remainder of said last named flaps for receiving said cone-shaped member, a removable pin for retaining said cone member in said grommets, said last named flaps when folded and said end wall defining said second compartment for receiving said pilot chute with said second bridle extending through the aperture in said end wall and attached to said bridle loop, said reinforcing members serving to facilitate packing of said main chute in said first compartment and stowage of said package in the aircraft and said clips serving to releasably retain said riser in folded condition during stowage of said package in the aircraft.

15. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced pockets secured to said main panel, an elongated reinforcing member disposed in each pocket, longitudinally spaced clips secured to the outer surface of said main panel, flexible fabric side panels secured along one edge to the opposite side edges of said main panel to provide side walls, eyelets in the outer edges of said side panels, a relatively rigid fabric end wall secured to said main panel and said side panels adjacent one end, an aperture in said end wall, overlapping closure flaps secured to said main and side panels adjacent the opposite end, registering apertures in certain of said flaps, a loop on one flap extending through said apertures when said flaps are folded in closing position, lacing means received in said eyelets from said one end to a point substantially midway of the length of said side panels and rip cord means received in the remainder of said eyelets to bring said other edges of said side panels together, said top wall, said side walls, said end wall and said closure flaps defining said first compartment substantially semi-circular in cross section, a bridle attaching loop secured to the inner surface of said main panel adjacent said end wall, a plurality of overlapping longitudinally extending flaps secured to said main panel and said side panels adjacent said end wall, one of said last named flaps having a metallic cone-shaped member secured to the outer surface adjacent the outer end, registering grommets in the outer ends of the remainder of said last named flaps for receiving said cone-shaped member, a removable pin for retaining said cone member in said grommets, said last named flaps when folded and said end wall defining said second compartment for receiving said pilot chute with said second bridle extending through the aperture in said end wall and attached to said bridle loop, said reinforcing members serving to facilitate packing of said main chute in said first compartment and stowage of said package in the aircraft and said clips serving to releasably retain said riser in folded condition during stowage of said package in the aircraft.

16. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced pockets secured to said main panel, an elongated reinforcing member disposed in each pocket, flexible fabric side panels secured along one edge to the opposite side edges of said main panel to provide side walls, eyelets in the other edges of said side panels, a relatively rigid fabric end wall secured to said main panel and said side panels adjacent one end, an aperture in said end wall, overlapping closure flaps secured to said main and side panels adjacent the opposite end, registering apertures in certain of said flaps, a loop on one flap extending through said apertures when said flaps are folded in closing position, lacing means received in said eyelets from said one end to a point substantially midway of the length of said side panels and rip cord means received in the remainder of said eyelets to bring said other edges of said side panels together, said top wall, said side walls, said end wall and said closure flaps defining said first compartment substantially semi-circular in cross section, a bridle attaching loop secured to the inner surface of said main panel adjacent said end wall, a plurality of overlapping longitudinally extending flaps secured to said main panel and said side panels adjacent said end wall, one of said last named flaps having a metallic cone-shaped member secured to the outer surface adjacent the outer end, registering grommets in the outer ends of the remainder of said last named flaps for receiving said cone-shaped member, a removable pin for retaining said cone member in said grommets, said last named flaps when folded and said end wall defining said second compartment for receiving said pilot chute with said second bridle extending through the aperture in said end wall and attached to said bridle loop, said reinforcing members serving to facilitate packing of said main chute in said first compartment and stowage of said package in the aircraft.

17. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced reinforcing members secured to said main panel, flexible fabric side panels secured along one edge to the opposite side edges of said main panel to provide side walls, eyelets in the other edges of said side panels, a relatively rigid fabric end wall secured to said main panel and said side panels adjacent one end, an aperture in said end wall, overlapping closure flaps secured to said main and side panels adjacent the opposite end, registering apertures in certain of said flaps, a loop on one flap extending through said apertures when said flaps are folded in closing position, lacing means received in said eyelets from said one end to a point substantially midway of the length of said side panels and rip cord means received in the remainder of said eyelets to bring said other edges of said side panels together, said top wall, said side walls, said end wall and said closure flaps defining said first compartment substan- tially semi-circular in cross section, a bridle attaching loop secured to the inner surface of said main panel adjacent said end wall, a plurality of overlapping longitudinally extending flaps secured to said main panel and said side panels adjacent said end wall, one of said last named flaps having a metallic cone-shaped member secured to the outer surface adjacent the outer end, registering grommets in the outer ends of the remainder of said last named flaps for receiving said cone-shaped member, a removable pin for retaining said cone-shaped member in said grommets, said last named flaps when folded and said end wall defining said second compartment for receiving said pilot chute with said second bridle extending through the aperture in said end wall and attached to said bridle loop, said reinforcing members serving to facilitate packing of said main chute in said first compartment and stowage of said package in the aircraft.

18. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced reinforcing members secured to said main panel, flexible fabric side panels secured along one edge to the opposite side edges of said main panel to provide side walls, eyelets in the other edges of said side panels, a relatively rigid fabric end wall secured to said main panel and said side panels adjacent one end, an aperture in said end wall, overlapping closure flaps secured to said main and side panels adjacent the opposite end, registering apertures in certain of said flaps, lacing means received in said eyelets from said one end to a point substantially midway of the length of said side panels and rip cord means received in the remainder of said eyelets to bring said other edges of said side panels together, said top wall, said side walls, said end wall and said closure flaps defining said first compartment substantially semi-circular in cross section, a bridle attaching loop secured to the inner surface of said main panel adjacent said end wall, a plurality of overlapping longitudinally extending flaps secured to said main panel and said side panels adjacent said end wall, one of said last named flaps having a cone-shaped member secured to the outer surface adjacent the outer end, registering grommets in the outer ends of the remainder of said last named flaps for receiving said cone-shaped member, a removable pin for retaining said cone member in said grommets, said last named flaps when folded and said end wall defining said second compartment for receiving said pilot chute with said second bridle extending through the aperture in said end wall and attached to said bridle loop, said reinforcing members serving to facilitate packing of said main chute in said first compartment and stowage of said package in the aircraft.

19. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced reinforcing members secured to said main panel, flexible fabric side panels secured along one edge to the opposite side edges of said main panel to provide side walls, eyelets in the other edges of said side panels, a relatively rigid fabric end wall secured to said main panel and said side panels adjacent one end, an aperture in said end wall, overlapping closure flaps secured to said main and side panels adjacent the opposite end, registering apertures in certain of said flaps, lacing means received in said eyelets from said one end to a point substantially midway of the length of said side panels and rip cord means received in the remainder of said eyelets to bring said other edges of said side panels together, said top wall, said side walls, said end wall and said closure flaps defining said first compartment, a bridle attaching loop secured to the inner surface of said main panel, adjacent said end wall, a plurality of overlapping longitudinally extending flaps secured to said main panel and said side panels adjacent said end wall, one of said last named flaps having a cone-shaped member secured to the outer surface adjacent the outer end, registering grommets in the outer ends of the remainder of said last named flaps for receiving said cone-shaped member, removable means for retaining said cone member in said grommets, said last named flaps when folded and said end wall defining said second compartment for receiving said pilot chute with said second bridle extending through the aperture in said end wall and attached to said bridle loop, said reinforcing members serving to facilitate packing of said main chute in said first compartment and stowage of said package in the aircraft.

20. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced reinforcing members secured to said main panel, flexible fabric side panels secured along one edge to the opposite side edges of said main panel to provide side walls, eyelets in the other edges of said side panels, a relatively rigid fabric end wall secured to said main panel and said side panels adjacent one end, an aperture in said end wall, overlapping closure flaps secured to said main and side panels adjacent the opposite end, registering apertures in certain of said flaps, rip cord means received in said eyelets to bring said other edges of said side panels together, said top wall, said side walls, said end wall and said closure flaps defining said first compartment, a bridle attaching loop secured to said main panel adjacent said end wall, a plurality of overlapping longitudinally extending flaps secured to said main panel and said side panels adjacent said end wall, one of said last named flaps having a cone-shaped member secured to the outer surface adjacent the outer end, registering grommets in the outer ends of the remainder of said last named flaps for receiving said cone-shaped member, removable means for retaining said cone member in said grommets, said last named flaps when folded and said end wall defining said second compartment for receiving said pilot chute with said second bridle extending through the aperture in said end wall and attached to said bridle loop, said reinforcing members serving to facilitate packing of said main chute in said first compartment and stowage of said package in the aircraft.

21. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced reinforcing members secured to said main panel, flexible fabric side panels secured along one edge to the opposite side edges of said main panel to provide side walls, eyelets in the other edges of said side panels, a relatively rigid fabric end wall secured to said main panel and said side panels adjacent one end, overlapping closure flaps secured to said main and side panels adjacent the opposite end, registering apertures in certain of said flaps, rip cord means received in said eyelets to bring said other edges of said side panels together, said top wall, said side walls, said end wall and said closure flaps defining said first compartment, a bridle attaching loop secured to said main panel adjacent said end wall, a plurality of overlapping longitudinally extending flaps secured to said main panel and said side panels adjacent said end wall, one of said last named flaps having a cone-shaped member secured to the outer surface adjacent the outer end, registering grommets in the outer ends of the remainder of said last named flaps for receiving said cone-shaped member, removable means for retaining said cone member in said grommets, said last named flaps when folded and said end wall defining said second compartment for receiving said pilot chute with said second bridle attached to said bridle loop, said reinforcing members serving to facilitate packing of said main chute in said first compartment and stowage of said package in the aircraft.

22. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced reinforcing members secured to said main panel, flexible fabric side panels secured along one edge to the opposite side edges of said main panel to provide side walls, rip cord receiving means in the other edges of said side panels, a relatively rigid fabric end wall secured to said main panel and said side panels adjacent one end, overlapping closure flaps secured to said main and side panels adjacent the opposite end, registering apertures in certain of said flaps, said top wall, said side walls, said end wall and said closure flaps defining said first compartment, a bridle attaching loop secured to said main panel adjacent said end wall, a plurality of overlapping longitudinally extending flaps secured to said main panel and said side panels adjacent said end wall, one of said last named flaps having a cone-shaped member secured to the outer surface adjacent the outer end, registering grommets in the outer ends of the remainder of said last named flaps for receiving said cone-shaped member, removable means for retaining said cone member in said grommets, said last named flaps when folded and said end wall defining said second compartment for receiving said pilot chute with said second bridle attached to said bridle loop, said reinforcing members serving to facilitate packing of said main chute in said first compartment and stowage of said package in the aircraft.

23. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced reinforcing members secured to said main panel, flexible fabric side panels secured along one edge to the opposite side edges of said main panel to provide side walls, rip cord receiving means in the other edges of said side panels, a relatively rigid fabric end wall secured to said main panel and said side panels adjacent one end, overlapping closure flaps secured to said main and side panels adjacent the opposite end, registering apertures in certain of said flaps, said top wall, said side walls, said end wall and said closure flaps defining said first compartment, a bridle attaching loop secured to said main panel adjacent said end wall, a plurality of overlapping longitudinally extending flaps secured to said main panel and side panels adjacent said end wall, registering grommets in the outer ends of said last named flaps, removable means received in said grommets, said last named flaps when folded and said end wall defining said second compartment for receiving said pilot chute with said second bridle attached to said bridle loop, said reinforcing members serving to facilitate packing of said main chute in said first compartment and stowage of said package in the aircraft.

24. A drag chute system for aircraft, said system including a main drag chute having a canopy and shroud lines, said shroud lines being attached to a riser for detachably connecting said main chute to an aircraft, a deployment bag having a compartment adapted to receive said main chute prior to deployment, a bridle attached to said canopy adjacent the center thereof and connected to said bag, a second compartment in said bag, a pilot chute having a canopy and shroud lines, a second bridle attached to said last named shroud lines and connected to said bag, said second compartment adapted to receive said pilot chute and said second bridle prior to deployment of said pilot chute, said deployment bag providing a unitary package for storage in the drag chute compartment of the aircraft, means associated with said second compartment to open the same and release said pilot chute therefrom and means associated with said first compartment to open the same and permit deployment of said main chute therefrom, said deployment bag comprising a substantially flat rectangular fabric main panel providing a top wall, a plurality of elongated, transversely disposed, longitudinally spaced reinforcing members secured to said main panel, flexible fabric side panels secured along one edge to the opposite side edges of said main panel to provide side walls, rip cord receiving means in the other edges of said side panels, a relatively rigid fabric end wall secured to said main panel and said side panels adjacent one end, overlapping closure flaps secured to said main and side panels adjacent the opposite end, registering apertures in certain of said flaps, said top wall, said side walls, said end wall and said closure flaps defining said first compartment, a bridle attaching loop secured to said main panel, a plurality of overlapping longitudinally extending flaps secured to said main panel and said side panels adjacent said end wall, removable means for retaining said last named flaps folded, said last named flaps when folded and said end wall defining said second compartment for receiving said pilot chute with said second bridle attached to said bridle loop, said reinforcing members serving to facilitate packing of said main chute in said first compartment and stowage of said package in the aircraft.

References Cited in the file of this patent
UNITED STATES PATENTS

| | | |
|---|---|---|
| 1,909,158 | Albihn | May 16, 1933 |
| 2,206,910 | McCarroll | July 9, 1940 |
| 2,352,721 | Krahel | July 4, 1944 |
| 2,770,432 | Stevinson | Nov. 13, 1956 |